March 14, 1950 — A. L. GATISS — 2,500,814
ELECTRIC OPERATED CLUTCH
Filed Jan. 25, 1947 — 4 Sheets-Sheet 1

FIG.1.

INVENTOR
Albert Leslie Gatiss
BY Harry J. Lucke
ATTORNEY

March 14, 1950  A. L. GATISS  2,500,814
ELECTRIC OPERATED CLUTCH

Filed Jan. 25, 1947  4 Sheets-Sheet 3

INVENTOR
Albert Leslie Gatiss
BY Harry J. Lucke
ATTORNEY.

March 14, 1950     A. L. GATISS     2,500,814
ELECTRIC OPERATED CLUTCH Filed Jan. 25, 1947     4 Sheets-Sheet 4

INVENTOR
Albert Leslie Gatiss
By Henry J. Lueke
ATTORNEY.

Patented Mar. 14, 1950

2,500,814

UNITED STATES PATENT OFFICE 2,500,814

ELECTRIC OPERATED CLUTCH

Albert Leslie Gatiss, Crossens, Southport, England, assignor to Brockhouse Engineering (Southport) Limited, Crossens, Southport, England, a British company Application January 25, 1947, Serial No. 724,395
In Great Britain February 11, 1946

11 Claims. (Cl. 192—40)

This invention relates to clutches for conveying rotary motion, and is applicable to clutches of the type wherein appreciable relative rotation is liable to be occurring between the driving and driven members of the clutch when it is required to engage the clutch, and it is desired to transmit substantial torques from the driving to the driven members of the clutch such as the torques which are transmitted by a hydro-kinetic transmission apparatus of a vehicle, more especially a torque convertor. Such clutches are required, for instance, for transmitting the torque from the transmission apparatus to a driven part such as, for instance, a gear box from which the drive is taken for any desired purpose, for example, in the case of a motor vehicle, to the vehicle wheels; the hydro-kinetic transmission apparatus being itself driven from a suitable power unit. Although the invention is particularly applicable to clutches for use in connection with hydro-kinetic transmission apparatus as above stated, it should be understood that its application is not limited thereto and it may be applied to any clutches of the above type.

By the expression hydro-kinetic transmission apparatus is meant that class of apparatus in which power is transmitted by the circulation of liquid due to difference in centrifugal head within a closed circuit comprising a driving impeller and a driven turbine both provided with vanes, and comprises both a simple hydraulic coupling and a torque convertor. A torque convertor is distinguished from a simple coupling by having a vaned reaction member or members in the circuit resulting in an output torque which is or can be substantially different to the input torque.

It is characteristic of hydro-kinetic transmission apparatus that so long as the impeller of the apparatus is being turned by the power unit some torque is imparted by the circulating liquid to the turbine which continues to rotate unless prevented by the application of a suitable restraining force.

Furthermore, in vehicles it is generally necessary to provide some form of gear box between the hydro-kinetic transmission apparatus and the wheels, for example, for the purpose of engaging a reverse drive and also a neutral gear position so that the wheels are disconnected entirely from the turbine which still transmits some torque even when the power unit is idling. With many forms of gear box the requisite gear change cannot be made without substantial shock if the gear box is connected directly to the turbine without the interposition of some form of clutch owing to the torque which is being transmitted by the turbine even when the power unit is idling.

The employment of a single friction clutch for the purpose of transmitting large torques is open to the objection that it has to be of very large diameter for which there may not be space available, while a very substantial operating force is required for actuating the clutch. These objections hold especially where the hydro-kinetic apparatus is a torque convertor wherein the maximum torque transmitted from the turbine to the driving member of the clutch may be very considerably greater than the torque produced by the power unit. This maximum torque may, in practice, only be transmitted at relatively infrequent intervals; for example, in the case of a vehicle when the vehicle is accelerating rapidly or ascending steep hills.

Consequently a friction clutch of the size necessary to transmit the torque is uneconomical as well, having regard to the normal torque transmitted, and as applied to vehicles the limitation of space and operating force is particularly important.

The above objections against the employment of a simple friction clutch for the purpose of transmitting large torques apply in general where clutches of the type above specified are employed, although the objections have an especial force where the clutch is connected to the turbine of a torque convertor.

The mere substitution of a simple positively engaging clutch such as an ordinary dog clutch in place of a simple friction clutch would not meet these difficulties as it would be open to the objection that the clutch could not be engaged without considerable shock, engagement being impossible if the relative rotation of the driving and driven members was considerable.

The primary object of the present invention is to provide a clutch which is capable of transmitting without slip between the driving and driven members a torque appreciably greater than that which can be transmitted without slip by a simple friction clutch of the same overall diameter and in which the clutch can be engaged to transmit such torque and without substantial shock.

A further object of this invention is to facilitate the employment of hydro-kinetic power transmission apparatus in which the impeller is connected permanently to the power unit and it is desired to provide a gear box in the drive between the turbine and the part to be driven; for example, the wheels in the case of a vehicle.

The invention is illustrated in the accompanying drawings, wherein.

Referring firstly to Figures 2 to 6 of the drawings, the clutch there illustrated comprises coaxial rotatable driving and driven members A, B by which the torque is transmitted to and from the clutch respectively, a dog element C of annular form slidably mounted on splines on the driving member A so as to be displaceable axially thereof while rotatable therewith.

The dog element C is provided at opposite ends with driving dog teeth $C^1$ and further dog teeth $C^2$ adapted respectively in one or the other extreme axial positions of the dog element to engage with driven dog teeth $B^1$ and shifter dog teeth $D^1$ respectively, the latter being provided on the adjacent end of an annular dog shifter element D referred to hereafter in the description by the term "shifter."

Figures 2, 3:
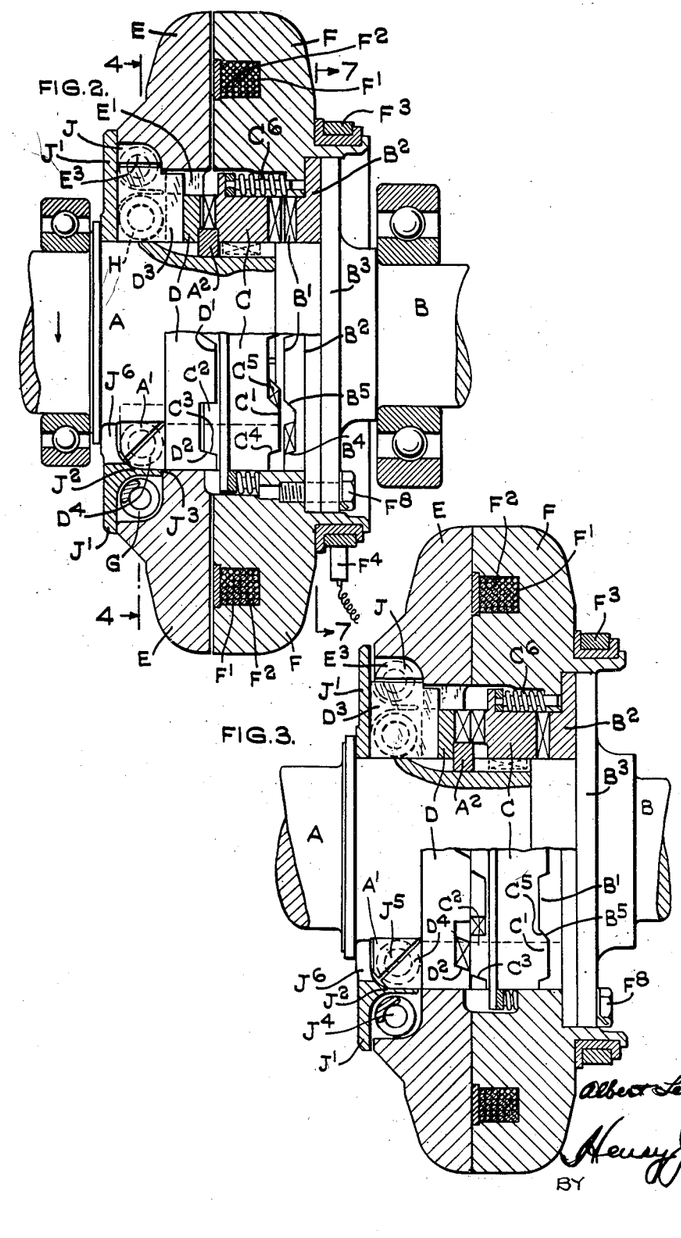
Figure 2 is a cross sectional view of the clutch shown in Figure 1, the parts being illustrated with the clutch in the disengaged position, the section being taken on the line 2—2 of Figure 4.
Figure 3 is a view similar to Figure 2 but showing the parts with the clutch fully engaged so as to transmit the maximum full load torque positively from the driving to the driven members.

This shifter is of annular form and is capable of rotation relative to the driving member A and about the axis thereof, and serves to shift the dog element axially of the driving member from the neutral position illustrated in Figure 2 in which the shifter dogs are in interengagement with the adjacent dogs on the dog element C to the fully engaged position shown in Figure 3 in which the driving teeth $C^1$ of the latter engage with the driven member dog teeth $B^1$ so that drive is transmitted positively from the driving to the driven member through the dog element C and dog teeth $B^1$. The shifter D is located against axial movement towards dog element C by annular flange $A^2$ which is mounted on driving member A and engages the inner face of the shifter.

The dog teeth $B^1$ in the arrangement illustrated are formed on an end face of a ring $B^2$ which is bolted to a flange $B^3$ integral with the driven member B.

Figure 4:
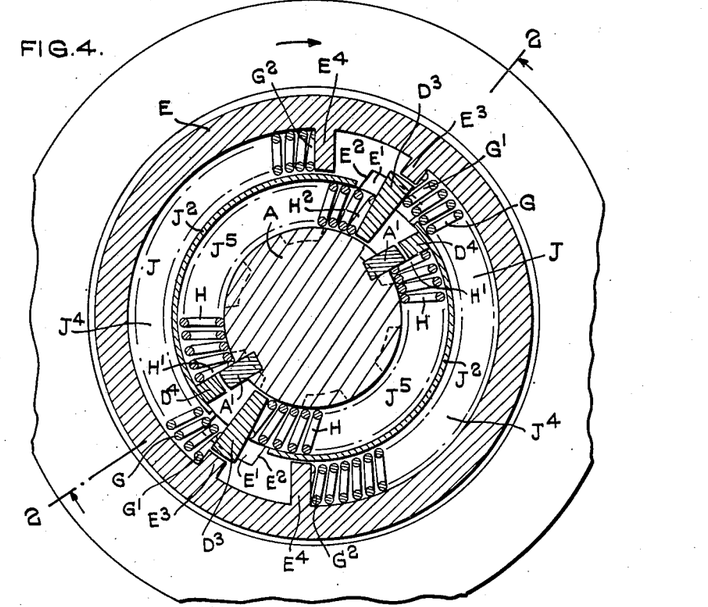
Figure 4 is a section on the line 4—4 of Figure 2, i. e. showing the parts with the clutch in the disengaged position.

To facilitate disengagement of the driving dog teeth $C^1$ from the driven dog teeth $B^1$, the interengaging side faces thereof $C^4$, $B^4$ respectively, which for the clockwise direction of rotation indicated in Figure 4 serve to transmit the torque from dog element C to driven member B, are disposed at a comparatively small inclination to the axis of the driving and driven members. To facilitate engagement of these teeth, the other set of side faces thereof, namely $C^5$ and $B^5$ respectively are disposed at a somewhat greater inclination to such axis as will be apparent from Figures 2 and 3 of the drawing, the smaller inclination for the first set of side faces being chosen to avoid undue load being transmitted to the shifter D when dog element C is in the fully engaged position.

To enable the shifter D when rotated relative to the driving member A and hence relative to the dog element C to slide the latter axially into the engaged position, one set of side faces of the interengageable teeth $D^1$, $C^2$ are disposed at an inclination similar to the inclination of the side faces $C^4$, $B^4$ as indicated at $D^2$ and $C^3$ respectively, the other set of side faces of these teeth $D^1$, $C^2$ being parallel to the central longitudinal axis of the driving and driven members.

The dog element C is spring urged towards the neutral position shown in Figure 2 by means of the axially extending compression springs $C^6$.

Extending around the parts so far described are driving and driven relatively slippable ringlike clutch elements E, F respectively, and which are in torque transmitting association with the driving and driven clutch members A, B respectively, and clutch element E is capable of transmitting up to a given torque to the driven element F without relative rotation or slip occurring between these elements.

Figure 1:
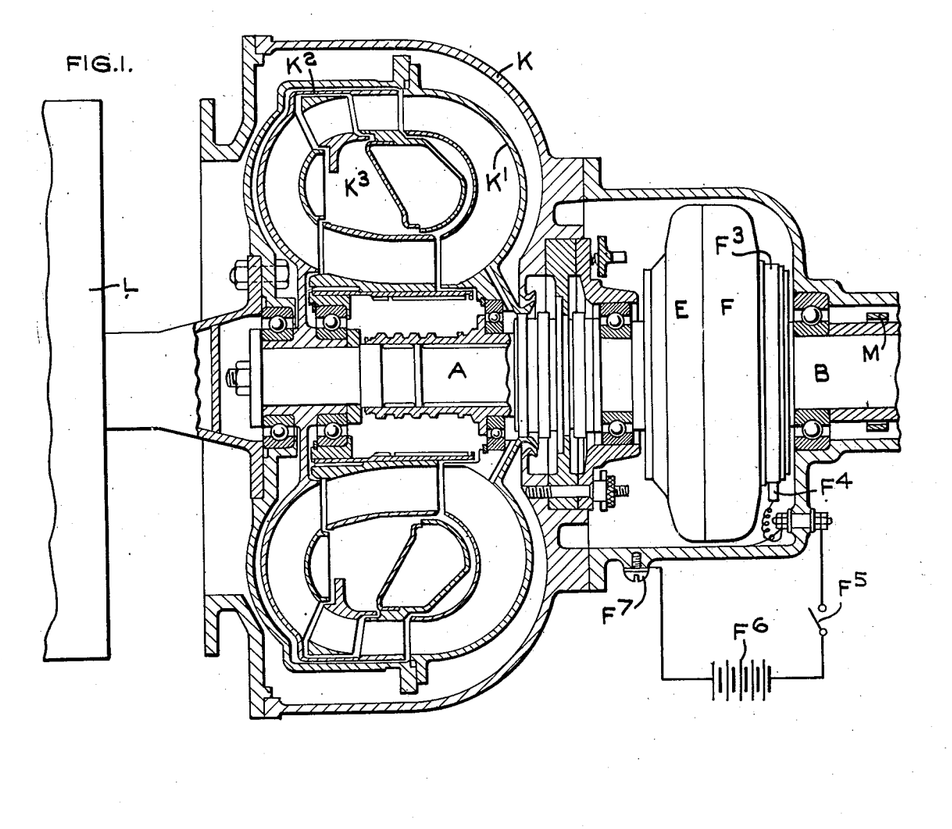
Figure 1 is a cross sectional side elevation illustrating in transmission apparatus of a road vehicle, the combination of one form of clutch in accordance with this invention with a torque convertor for the purpose of transmitting the drive from the turbine of the convertor to a gear box not shown in the drawing.

To permit of this, in the arrangement illustrated the elements E and F form the two principal parts of a known type of electro-magnetic clutch and are each made of iron or other magnetisable material so that they form the core of a magnetic field which is energized by the electromagnetic coil $F^1$ which is housed in annular groove $F^2$ formed in the face of driven element F which is opposite to driving element E. This coil has one lead connected to insulated slip ring $F^3$ engaged by brush $F^4$ and is arranged in circuit with a switch $F^5$ and battery $F^6$ as shown in Figure 1, the circuit being completed by the earth return $F^7$ as indicated back to the other end of the energizing coil which is earthed to the element F.

The driving clutch element E is mounted for slight axial movement relative to driven element F so that when the coil $F^1$ is not energized the two elements are capable of free relative rotation with a limited clearance between them as indicated in Figure 2, while when switch $F^5$ is closed to energize the coil $F^1$ a magnetic field is produced in the two elements E and F so that element E is attracted into close contact with element F as shown in Figure 3 so that torque can be transmitted from driving element E to driven element F as a result of the friction now obtaining between the opposed faces of these elements consequent upon them being held in close contact as above described.

Such magnetic clutches are known in various forms and only the most simple arrangement has been illustrated. Whatever form of magnetic clutch is employed must include two elements capable of relative rotation, namely the elements E and F in the drawing, which are adapted to transmit up to a given torque without slip or relative rotation, which torque is substantially less than the maximum torque it is desired to transmit by the clutch as a whole, the elements slipping or rotating relatively when such given torque is exceeded.

The driven clutch element F in the arrangement illustrated is secured by bolts $F^3$ to the driven clutch member B so as to rotate solid therewith, which bolts serve also to secure the ring $B^2$ and its associated dog teeth rigidly to the driven clutch member B.

The driving clutch element E is, like the shifter D, mounted for rotation relative to the driving member A and about the axis thereof, but rotation of this element as well as of the shifter D relative to the driving member A is controlled by means of circumferentially arranged shifter control springs which serve to rotate the shifter D relative to the dog member C thereby bringing the latter into engagement with the driven dog teeth and also bringing the shifter dog teeth $D^1$ out of or into register with the dog member teeth $C^2$, thereby (in the outer of register position) retaining the dog member C in the engaged position illustrated in Figure 3 or (in the in register position) allowing it to return to the neutral position under the influence of springs $C^3$ as shown in Figure 2.

Figure 5:
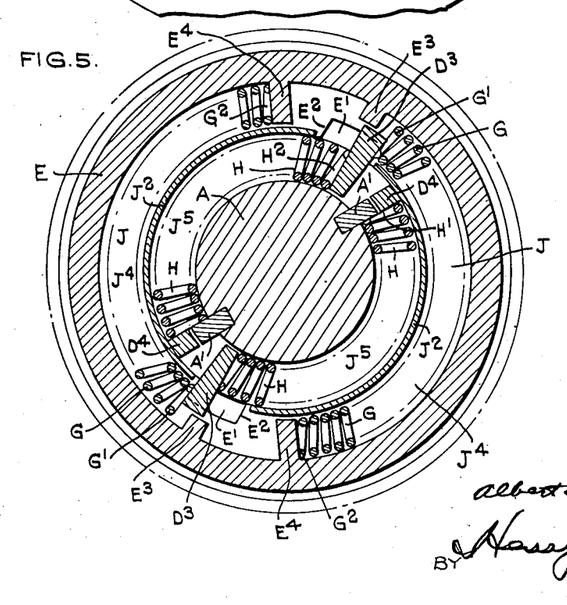
Figure 5 is a view similar to Figure 4 showing the parts in position when the clutch is in the first stage towards full engagement.
Figure 6:
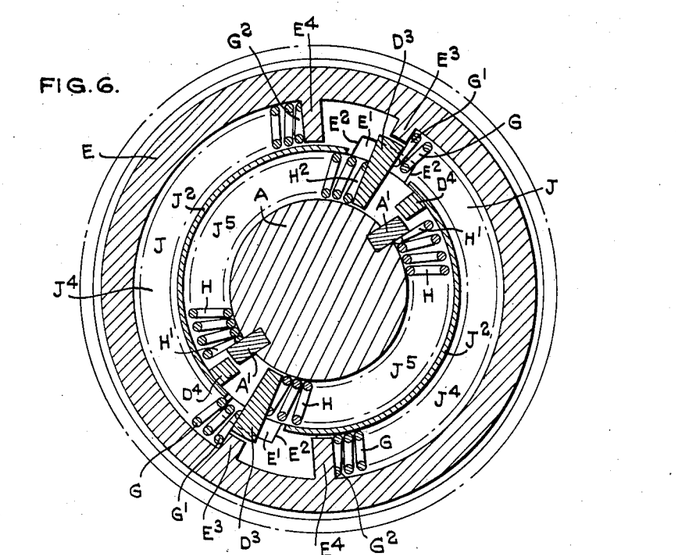
Figure 6 is a further view similar to Figure 4 showing the parts when the clutch is fully engaged.

The arrangement of these shifter control springs is shown most clearly in Figures 4, 5 and 6, from which it will be seen that there are provided a pair of circumferentially extending outer coiled compression springs G which serve as clutch engaging springs, and a pair of inner circumferentially extending coiled compression springs H which serve as clutch disengaging springs, the two springs of each pair being disposed symmetrically on opposite sides of the driving member A.

The springs are located within an annular recess J provided between the clutch element E and the driving member A, the recess being closed on its outer end by the closure ring $J^1$ which has an integral inwardly extending axial flange $J^2$, the free end $J^3$ of which is in close proximity with the adjacent inner edge of the driving element E, thus dividing the recess J into two concentric annular spring containing compartments $J^4$, $J^5$ in which the springs G and H are respectively housed.

The ring-like driving element E is formed on its interior face and at the end nearest element F with a pair of diametrically opposed axially extending grooves $E^1$ having each circumferentially spaced side faces $E^2$.

Spaced axially from each of the grooves $E^1$ the driving element E is further formed with an integral lug $E^3$ which extends radially inwardly into compartment $J^4$ for a distance corresponding to a half diameter of the coiled outer springs G and spaced circumferentially a short distance from each of the lugs $E^3$ are further similar lugs $E^4$ of a greater radial length which extend radially inwardly by a distance corresponding to the full diameter of the springs G. Adjacent to each of the lugs $E^3$ the shifter D is provided with radially extending lugs $D^3$ which project one into each of the said grooves $E^1$ and one end $G^1$ of each of the springs engages half with the outer end of one of the lugs $D^3$ at one side thereof and half with one of the lugs $E^3$ with the parts in the position shown in Figure 4. The other end $G^2$ of each of these springs engages solely with the lugs $E^4$. Rotation of the shifter D relative to clutch element E is limited by the circumferentially spaced side faces $E^2$ of the grooves $E^1$ being adapted to engage with lugs $D^3$ thus preventing over-compression of the springs G.

On the opposite side of each of the lugs $D^3$ to that of the spring ends $G^1$ the lugs engage wholly with one end $H^2$ of each of the inner springs H, the opposite ends $H^1$ of which in the position shown in Figure 4 engage half with further shifter lugs $D^4$ integral with the shifter element D and half with lugs $A^1$ housed in diametrically opposite slots on the periphery of the driving member A so as to rotate solid therewith, and conveniently the opposed edges of the lugs $A^1$ and $D^4$ extend at 45° to the radius of driving member A as will be apparent from Figures 2 and 3.

To enable the closure ring $J^1$ to be assembled in position, its inner edge is formed with grooves $J^6$ at positions corresponding to the lugs $A^1$ and its flange $J^2$ is gapped at positions corresponding to the grooves $E^1$ and for a circumferential distance corresponding to that of these grooves.

The springs G and H are placed under an initial compressive stress when they are positioned in their respective compartments, the initial stress of the outer springs G being made substantially greater than that of the inner springs H so that if member A and element E are rotated relative to shifter D in opposite directions by an equal amount so as equally to compress the springs H and G, the latter will exert a resultant torque on D, turning D in an anti-clockwise direction.

With the parts as shown in Figure 4, however, expansion of both springs G and H is prevented by reason of the fact that their opposite ends are engaged between lugs $E^3$ and $E^4$, and $D^3$ and $D^4$ respectively, so that relative to the springs the parts shown in Figure 4 are in a state of equilibrium.

The operation of the clutch construction as above described is as follows:

The driving member A will be assumed to be rotating clockwise in Figure 4 and the clutch will be assumed to be initially disengaged, i. e. the parts in the position shown in Figures 2 and 4, namely, with switch $F^5$ open. In this position the clockwise rotation of the driving member A acting through lugs $A^1$ carries around with it inner springs H whence the drive is transmitted through lugs $D^3$ to outer springs G and thence through lugs $E^4$ to driving clutch element E which consequently rotates at the same speed as driving member A, while driven clutch element F and driven clutch member B remain stationary and dog member C is held by springs $C^6$ out of engagement with driven dogs $B^1$ and rotates with member A by virtue of its splined connection thereto. Consequently no drive is transmitted to driven member B.

In the above described disengaged position it should be noted that shifter D rotates with member A by virtue of the engagement between its dog teeth and those of dog member C and also by the above mentioned transmission of the torque from member A to shifter lugs $D^3$ through springs H.

Assuming that an appreciable torque is available for transmission to driving member A and it is desired to engage the clutch, switch $F^5$ is now closed so as to energise the coil $F^1$, whereupon the driving clutch element E is attracted, thereby applying a retarding torque to driving element E which consequently has a tendency to move anti-clockwise relative to driving member A, i. e. relative to shifter D which is rotating with member A, thus compressing outer springs G and bringing lugs $E^3$ out of engagement with the springs G. This relative rotation of element E and shifter D is limited by one set of side faces $E^2$ of grooves $E^1$ engaging shifter lugs $D^3$, the position of the parts being then as shown in Figure 5.

If the clutch engaging torque between the elements E and F is small, i. e. if the load on the driven member B is low, element F will now rotate with element E without slip with the parts remaining in the position shown in Figure 5 in which the torque is transmitted from driving member A to driving element E along two paths, namely, through lugs $A^1$, springs H, lugs $D^3$, springs G and lugs $E^4$; and also from member A to dog member C through the inclined side faces $C^3$ and $D^2$ of the interengaging dog teeth $C^2$, $D^1$ to shifter D whence the drive is similarly transmitted through lugs $D^3$ to springs G and thence to lugs $E^4$.

If, however, the load on the driven member B is substantial so that driving member A is being subjected to a substantial retarding torque, there will be a substantial force between the inclined side faces $D^2$ and $C^3$ of the interengaging dog teeth, which will cause dog member C to be slidden axially against springs $C^6$ towards driven member B, thus allowing shifter D to rotate anti-clockwise relative to dog element C, i. e. relative to driving member A, while simultaneously the substantial torque which is being transmitted through springs H onto shifter D is sufficient to overcome the initial compressive stress in these springs so that they are compressed further, with the result that member A rotates clockwise relative to shifter D, i. e. element C rotates clockwise relative to shifter D, and so further sliding element C towards member B by virtue of the inclination of the side faces $D^2$, $C^3$ of their interengaging dog teeth.

In the event of dog teeth $C^1$ and $D^1$ being in register, the displacement of dog element C towards driven member B is sufficient to interengage these teeth, but if the teeth are not in register and there is no relative rotation occurring between members A, C on the one hand, and driven member B on the other hand, engagement will be prevented and the torque continues to be transmitted solely through the clutch elements E and F, shifter D still exerting on dog element C a force tending to displace the latter into full engagement with driven teeth $B^1$.

As soon as the torque transmitted increases beyond the maximum non-slip value so that slip now occurs between the elements E and F, corresponding movement will take place between dog member C (which rotates with element E) and driven dog teeth $B^1$ (which rotate with element F), until teeth $C^1$ and $B^1$ are in register, whereupon the dog member C is displaced by shifter D in the manner described so as fully to engage these parts together and transmit the drive positively from the driving member A to the driven member B through the dog teeth $C^1$ and $B^1$.

As soon as the drive is being transmitted positively from the driving to the driven members, slipping ceases between the clutch elements E and F, and since the electric circuit is still closed element E now rotates solid with element F, i. e. element E is fixed in relation to driving member A. Furthermore, as soon as dog element C is fully engaged with driven dog teeth $B^1$, its teeth $C^2$ are completely out of engagement with shifter dog teeth $D^1$ so that the anti-clockwise torque exerted by compressed outer springs G on shifter D is resisted only by inner springs H acting between lugs $D^3$ and $A^1$, and since, as already stated, these springs are substantially weaker than outer springs G, shifter D is rotated anti-clockwise relative to element E and member A (which is rotating solid therewith) into the position shown in Figure 6 in which the spring ends $G^1$ re-engage with lugs $E^3$, i. e. springs G are fully expanded and springs H are compressed. This rotation of shifter D relative to member A and hence relative to dog element C brings shifter teeth $D^1$ out of register with dog element teeth $C^2$ so that the latter is held positively in engagement with driven member teeth $B^1$. In this position, as will be apparent from Figure 6, shifter D is rotating with element E and is no longer subject to any force from outer springs G.

If it is now desired to disengage the clutch, switch $F^5$ is opened so that coil $F^1$ is no longer energised and element E is now free to move relative to element F, i. e. driving member A is free to move relative to element E, i. e. relative to shifter D which is in equilibrium with respect to element E. Consequently inner springs H are now free to expand and rotate driving member A anti-clockwise relative to shifter D and element E from the position shown in Figure 6 back to the disengaged position shown in Figure 4, simultaneously displacing dog element C anti-clockwise relative to shifter D so that teeth $C^2$ and $D^1$ are now in register, whereupon dog element C is shifted axially by springs $C^6$ out of engagement with driven dogs $B^1$ to completely disengage the clutch, the parts returning exactly to the position shown in Figures 2 and 4. Disengagement of dog teeth $C^1$ and $B^1$ is facilitated by their inclined side faces $C^4$, $B^4$.

In the above described form of clutch the maximum torque obtaining under full load conditions is intended to be transmitted positively from the driving to the driven members through dog element C, driving dog teeth $C^1$, and driven dog teeth $B^1$, while the relatively rotatable or relatively slippable elements E, F are capable of transmitting up to a given proportion of such torque without slip, slip or relative rotation between these elements occurring when such proportion of torque is exceeded, the slip which occurs being utilised to engage the parts $C^1$ and $B^1$ so as then positively to transmit up to full torque under full load conditions without slip, and with the above described construction synchronisation or approximate synchronisation of these interengageable connecting parts $C^1$ and $B^1$ is effected prior to their engagement.

Such a construction of clutch is intended for use under circumstances where under the conditions of engagement expected to be met with in practice, the relative speeds of the driving and driven members are not unduly great.

One application of this clutch is shown in Figure 1 in which the clutch is interposed in the drive between a torque convertor indicated generally at K and a gear box not shown in the drawing.

This torque convertor is of known form and comprises the usual vaned impeller $K^1$, and vaned turbine $K^2$ to which the driving member A is directly connected, and vaned reaction member $K^3$, the impeller being directly connected without the medium of a clutch to a power unit indicated generally at L, and the whole embodied in a road vehicle in the known way.

The provision of the clutch so far described in the apparatus illustrated in Figure 1 serves normally to disconnect the turbine $K^2$ entirely from the gear box, for instance, for the purpose of engaging a reverse drive and a neutral gear position, but it may be found that with the construction of clutch described, there is slight residual magnetism in the solenoid when the circuit has been broken so that a very slight torque is transmitted from the turbine to the driven member B, i. e. to the gear box, even when the clutch is in the disengaged position, and to facilitate a change of gear position the driven member may be fitted with any known form of clutch stop indicated generally at M for the purpose of completely arresting the driven member when the clutch is disengaged, which clutch stop, together with the switch $F^5$, may be operated from a common operating member.

In the event of the clutch so far described being used under circumstances where relative speed between the driving and driven members on engagement of the clutch is likely to be substantial, it is necessary positively to prevent dog element C from engaging with driven dog teeth $B^1$ until synchronisation or approximate synchronisation of these two parts has been effected.

If, for instance, when dog element C is slidden axially following closure of switch $F^5$ and its teeth $C^1$ happen to come into register with teeth $B^1$ when the engaging position is reached, then considerable noise would occur if substantial relative rotation was taking place between the teeth $C^1$ and $B^1$.

Figure 7:
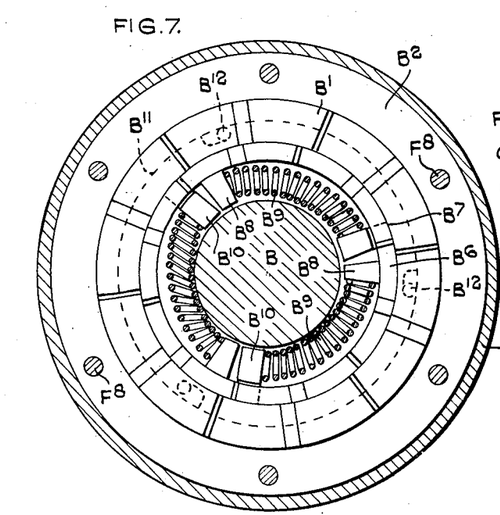
Figure 7 is a sectional view on the lines 7—7 of Figure 2 but illustrating a modification to the construction shown in that Figure.
Figure 8:
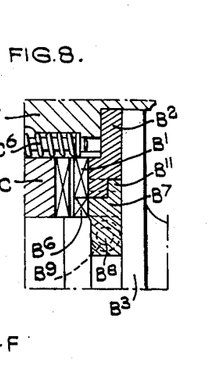
Figure 8 is an enlarged cross sectional view illustrating the modification shown in Figure 7.

In order to prevent such engagement of these teeth under these circumstances, the construction may be modified by providing the driven member B with synchroniser teeth $B^6$ as shown in Figures 7 and 8.

For this purpose the driven ring $B^2$ which carries the teeth $B^1$ is divided circumferentially into two parts, namely, an outer part $B^2$ and an inner part $B^7$ with which are integrally formed the teeth $B^6$. The latter are of identical configuration and circumferential spacing to the teeth $B^1$ but are normally retained out of register with the teeth $B^1$ by mounting part $B^7$ for limited circumferential movement relative to the part $B^2$, the part $B^7$ being urged in an anti-clockwise direction relative to the part $B^2$ by providing the part $B^7$ with inwardly extending integral lugs $B^8$, one face of which is acted upon by one end of compression springs $B^9$, the other end of which engage with further lugs $B^{10}$ integral with the outer ring part $B^2$, the relative movement being limited by forming the inner part $B^7$ with a peripheral flange $B^{11}$ having a number of short tangentially extending gaps into which extend axial pins $B^{12}$ carried upon the outer ring part $B^2$, and as will be seen from Figure 7, normally the teeth $B^6$ are urged by the springs $B^9$ so that they are out of register with the teeth $B^1$.

In this out of register position displacement of dog element C so as to engage its teeth with driven teeth $B^1$ is positively prevented, and this condition holds so long as there is substantial relative movement between driving member A and dog element C rotating therewith, and driven member B; teeth $C^1$ merely skipping over driven teeth $B^1$ and synchroniser teeth $B^6$. Although the fact that dog element C is rotating in an anti-clockwise direction may by the engagement of its teeth with synchroniser teeth $B^6$ move these clockwise towards the in register position, so long as the relative speeds are substantial the synchroniser teeth are never brought into a position in which they are in full register, the teeth $C^1$ merely skipping over the synchroniser teeth $B^6$ which are continually returned to the fully out of register position by the springs $B^9$.

If, however, the relative rotation between the driving and driven members is comparatively small there is sufficient time when dog element C engages with synchroniser teeth $B^6$ to displace these in a clockwise direction to the fully in register position in which the teeth can completely interengage.

Initial engagement between dog element teeth $C^1$ and synchroniser teeth $B^6$ before teeth $C^1$ engage at all with teeth $B^1$ is ensured by tapering the side faces of teeth $C^1$, $B^1$ to an extent such that the circumferential length of the outer ends of the teeth $C^1$ is less than the distance between the outer edge of each tooth $B^6$ and the edge of the nearest tooth $B^1$, when the teeth $B^6$ are in the out of register position.

Instead of providing magnetic means for interengaging clutch elements E and F so that these elements can slip relatively when the torque exceeds a certain value, any other means, for example, friction means or hydraulic means, may be employed.

Furthermore, instead of providing a pair of each of the springs G and H, only one of each of these springs may be employed, although the arrangement illustrated is preferred.

The clutch so far described will not transmit a reverse drive positively through the dog element C, and will only transmit a reverse drive through the clutch elements F and E. To provide for a reverse positive drive it is necessary to have a double set of inner and outer springs G and H with a correspondingly increased number of lugs on the driving member A, shifter D and element E, and in such event, these lugs would all be spaced symmetrically around the axis of driving member A with the springs correspondingly arranged so as each to subtend at an angle of approximately 60° instead of 150° as shown.

A clutch in accordance with this invention can be made of an overall diameter, which for a given maximum torque capable of being transmitted by the clutch, is substantially less than that of an ordinary friction clutch capable of transmitting the same maximum torque without slip.

What I claim then is:

1. A clutch for conveying rotary motion comprising in combination co-axial rotatable driving and driven members, a dog element mounted non-rotatably on said driving member so as to rotate therewith, said dog element having at each end thereof a set of dog teeth forming shifter engaging dog teeth and driving dog teeth, a shifter element rotatable relative to said dog element and driving member around the axis of the latter and located against axial movement relative to said driving member, said shifter element having at one end thereof dog teeth interengageable with said shifter engaging teeth of said dog element, said interengageable dog and shifter element teeth having each one set of interengageable side faces which are inclined to the axis of rotation of the driving member and dog element, said driven member having driven dog teeth interengageable with said driving dog teeth, said dog element being movable axially of said driving member to engage either with said shifter dog teeth or said driven dog teeth, relatively slippable driving and driven clutch elements in torque transmitting association with said driving and driven members respectively, controllable means for interengaging said elements non-positively, said elements being adapted to transmit up to a given torque without relative movement, and to slip relatively when said torque is exceeded, means for transmitting said slip to said dog element and driven member to bring said driving and driven dog teeth into register, means for rotating said shifter element relative to said dog element so as to apply a force to the said inclined side faces of the teeth of said dog element and displace the latter axially into driving engagement with said driven dog teeth, means for rotating said shifter element relative to said dog element to bring said shifter teeth out of register with said interengageable dog element teeth when the dog element has been engaged with said driven dog teeth so long as said control means is in the torque transmitting position, means for bringing said last mentioned sets of teeth into register to permit of them again interengaging when said control means is operated to disengage the driving and driven slippable clutch elements, and means for displacing said dog element axially out of engagement with the driven dog teeth when the dog element teeth are in position for engagement with the shifter element teeth to thereby disengage the clutch.

2. A clutch according to claim 1 including spring means operating between the driving slippable element and the shifter element which serve to hold the latter with its teeth out of register with the adjacent dog element teeth to retain the dog element in engagement with the driven teeth, further spring means operating between the shifter element and the clutch driving member acting in a direction opposite to said first mentioned spring, means being provided and operating when said driving and driven slippable clutch elements are disengaged to rotate said shifter element relative to said dog element into a position in which the interengaging teeth of these two elements are in register.

3. A clutch according to claim 2 wherein the spring means comprise circumferentially extending coiled compression springs acting between lugs associated with the driving element and the shifter element in the case of the first mentioned spring means and acting between lugs associated with the shifter element and the driving clutch member in the case of the second mentioned spring means.

4. A clutch according to claim 3 wherein the springs are maintained in a compressed state and their expansion is limited by providing in the case of the first mentioned spring means lugs on the driving clutch element at each end of each spring adapted to engage therewith and in the case of the second mentioned spring means lugs on the shifter element adapted to engage with each end of each spring, the arrangement being such that one end of each spring is engaged wholly by a driving element lug or a shifter lug respectively, while at the other end each spring is engaged by a shifter lug and driving member lug respectively and is there adapted when fully expanded to be engaged also by a second driving element lug and second shifter element lug respectively.

5. A clutch according to claim 4 including means for preventing said driving engagement between the driving and driven dog teeth until these parts are substantially in synchronisation with one another.

6. A clutch according to claim 5 wherein said means for preventing said driving engagement between the driving and driven dog teeth comprises synchroniser teeth shaped and arranged similarly to the driven member teeth and mounted for limited circumferential spring controlled movement in relation thereto so as positively to prevent interengagement between the dog element and the driven member teeth when the relative speeds of these parts are substantial but being adapted to be engaged by the dog element teeth and brought into register with the driven member teeth to permit of engagement between the latter and the dog element when the parts are rotating synchronously or approximately synchronously.

7. A clutch for conveying rotary motion comprising in combination co-axial rotatable driving and driven members, a dog element mounted non-rotatably on said driving member so as to rotate therewith, said dog element having at each end thereof a set of dog teeth forming shifter engaging dog teeth and driving dog teeth, a shifter element rotatable relative to said dog element and driving member around the axis of the latter and located against axial movement relative to said driving member, said shifter element having at one end thereof dog teeth interengageable with said shifter engaging teeth of said dog element, said interengageable dog and shifter element teeth having each one set of interengageable side faces which are inclined to the axis of rotation of the driving member and dog element, said driven member having driven dog teeth interengageable with said driving dog teeth, said dog element being movable axially of said driving member to engage either with said shifter dog teeth or said driven dog teeth, relatively slippable driving and driven clutch elements in torque transmitting association with said driving and driven members respectively, controllable means for interengaging said elements non-positively, said elements being adapted to transmit up to a given torque without relative movement, and to slip relatively when said torque is exceeded, means for transmitting said slip to said dog element and driven member to bring said driving and driven dog teeth into register, means for rotating said shifter element relative to said dog element so as to apply a force to the said inclined side faces of the teeth of said dog element and displace the latter axially into driving engagement with said driven dog teeth, means for preventing said driving engagement between the driving and driven dog teeth until these parts are substantially in synchronisation with one another, means for rotating said shifter element relative to said dog element to bring said shifter teeth out of register with said interengageable dog element teeth when the dog element has been engaged with said driven dog teeth so long as said control means is in the torque transmitting position, means for bringing said last mentioned sets of teeth into register to permit of them again interengaging when said control means is operated to disengage the driving and driven slippable clutch elements, and means for displacing said dog element axially out of engagement with the driven dog teeth when the dog element teeth are in position for engagement with the shifter element teeth to thereby disengage the clutch.

8. A clutch according to claim 7 wherein said means for preventing said driving engagement between the driving and driven dog teeth comprises synchroniser teeth shaped and arranged similarly to the driven member teeth and mounted for limited circumferential spring controlled movement in relation thereto so as positively to prevent interengagement between the dog element and the driven member teeth when the relative speeds of these parts are substantial but being adapted to be engaged by the dog element teeth and brought into register with the driven member teeth to permit of engagement between the latter and the dog element when the parts are rotating synchronously or approximately synchronously.

9. A clutch for conveying rotary motion comprising driving and driven members, non-positive clutch means including driving and driven clutch elements, said clutch means being controllable by the operator and adapted to transmit up to a predetermined torque value from the driving member to the driven member without slip occurring between said elements of said clutch means, positive clutch means adapted to transmit positively torque in excess of said predetermined value from the driving to the driven member of the clutch, said non-positive clutch means being adapted to bring the elements of the positive clutch means into synchronisation or approximate synchronisation prior to their engagement, means adapted automatically to effect the engagement of said positive clutch means without any intervention of the operator on slip occurring between the non-positive clutch elements, and means for disengaging said positive clutch means automatically by the mere disengagement of the non-positive clutch means by the operator.

10. A clutch for conveying rotary motion comprising driving and driven members, interengageable driving and driven clutch dogs mounted non-rotatably on said driving and driven members respectively, interengageable relatively slippable driving and driven clutch elements adapted to transmit up to a given torque from the driving to the driven member of the clutch without relative slip occurring between said clutch elements, control means operable by the operator for effecting engagement and disengagement between said relatively slippable clutch elements, said clutch elements being adapted to rotate relatively in the engaged position when said given torque is exceeded, means operable by said relative rotation adapted to displace said interengageable clutch dogs relatively into position for interengagement, means adapted independently of said control means to effect said engagement of said clutch dogs when the latter are rotating substantially in synchronisation with one another, and means for disengaging said clutch dogs automatically by the mere disengagement on the part of the operator of said relatively slippable clutch elements.

11. A clutch for conveying rotary motion comprising driving and driven members, interengageable driving and driven clutch dogs mounted non-rotatably on said driving and driven members respectively, said driving clutch dog being mounted for axial sliding movement on the driving member of the clutch, a shifter element mounted for rotation relative to the driving clutch dog and adapted when rotated into one position to displace the latter into engagement with the driven clutch dog and when rotated into another position to permit of it disengaging from the driven clutch dog, spring return means for effecting said disengagement of the driving clutch dog, interengageable relatively slippable driving and driven clutch elements adapted to transmit up to a given torque from the driving to the driven member of the clutch without relative slip occurring between said clutch elements, control means operable by the operator for effecting engagement and disengagement between said relatively slippable clutch elements, said clutch elements being adapted to rotate relatively in the engaged position when said given torque is exceeded, means operable by said relative rotation of said clutch elements adapted to rotate said shifter element into the one position so as to engage said clutch dogs, and means operable by disengagement of said clutch elements from said control means adapted to effect further rotation of said shifter element into the other position to permit of disengagement of the clutch dogs.

ALBERT LESLIE GATISS.

REFERENCES CITED

The following references are of record in the file of this patent:

UNITED STATES PATENTS

| Number | Name | Date |
|---|---|---|
| 2,106,423 | Lavaud | Jan. 25, 1938 |
| 2,226,801 | Black | Dec. 31, 1940 |
| 2,320,116 | Avila | May 25, 1943 |
| 2,339,969 | White | Jan. 25, 1944 |
| 2,364,331 | White | Dec. 5, 1944 |
| 2,369,843 | Neracher et al. | Feb. 20, 1945 |
| 2,375,783 | Gilfillian | May 15, 1945 |
| 2,397,883 | Peterson | Apr. 2, 1946 |